United States Patent
Trainin et al.

(10) Patent No.: US 9,872,251 B2
(45) Date of Patent: Jan. 16, 2018

(54) AWAKE WINDOW PROTECTION

(71) Applicants: Solomon Trainin, Haifa (IL); Carlos Cordeiro, Portland, OR (US)

(72) Inventors: Solomon Trainin, Haifa (IL); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/279,901

(22) Filed: Sep. 29, 2016

(65) Prior Publication Data

US 2017/0311260 A1 Oct. 26, 2017

Related U.S. Application Data

(60) Provisional application No. 62/327,720, filed on Apr. 26, 2016.

(51) Int. Cl.
*H04W 52/00* (2009.01)
*H04W 72/12* (2009.01)
*H04W 52/02* (2009.01)

(52) U.S. Cl.
CPC ... *H04W 52/0229* (2013.01); *H04W 72/1278* (2013.01)

(58) Field of Classification Search
CPC .............. H04W 52/00; H04W 52/0209; H04W 52/0229; H04W 72/12; H04W 72/1278
See application file for complete search history.

(56) References Cited

U.S. PATENT DOCUMENTS

| 2006/0146769 | A1 | 7/2006 | Patel et al. | |
|---|---|---|---|---|
| 2011/0305216 | A1* | 12/2011 | Seok | H04W 74/08 370/329 |
| 2012/0170453 | A1 | 7/2012 | Tiwari | |
| 2015/0319609 | A1* | 11/2015 | Asterjadhi | H04W 74/006 370/328 |
| 2016/0165637 | A1* | 6/2016 | Kim | H04W 28/18 370/329 |
| 2016/0183187 | A1* | 6/2016 | Park | H04W 52/0225 370/311 |
| 2016/0295509 | A1* | 10/2016 | Saed | H04W 28/0221 |
| 2017/0208542 | A1* | 7/2017 | Kim | H04W 52/02 |

FOREIGN PATENT DOCUMENTS

| WO | 2007081614 | 7/2007 |
|---|---|---|
| WO | 2009107180 | 9/2009 |
| WO | 2015105392 | 7/2015 |

OTHER PUBLICATIONS

International Search Report and Written Opinion for PCT Application No. PCT/US2017/024534, dated Jul. 10, 2017, 13 pages.

\* cited by examiner

*Primary Examiner* — Blane Jackson
(74) *Attorney, Agent, or Firm* — Eversheds Sutherland (US) LLP

(57) ABSTRACT

This disclosure describes systems, methods, and devices related to awake window (AW) protection. A device may identify a beacon frame received from a first device. The device may identify an information element associated with a first awake window (AW) within the beacon frame. The device may suspend one or more first backoff timers for a duration of the first AW. The device may associate a second backoff timer with a management frame.

20 Claims, 6 Drawing Sheets

AWAKE WINDOW PROTECTION

CROSS-REFERENCE TO RELATED APPLICATIONS

This application claims the benefit of U.S. Provisional Application No. 62/327,720 filed Apr. 26, 2016, the disclosure of which is incorporated herein by reference as if set forth in full.

TECHNICAL FIELD

This disclosure generally relates to systems and methods for wireless communications and, more particularly, to awake window protection.

BACKGROUND

Wireless devices are becoming widely prevalent and are increasingly requesting access to wireless channels. The growing density of wireless deployments requires increased network and spectrum availability. Wireless devices may communicate with each other using directional transmission techniques, including but not limited to beamforming techniques. Wireless devices may communicate over a directive multi-gigabit (DMG), a next generation 60 GHz (NG60) network, an enhanced directional multi-gigabit (EDMG) network, and/or any other network.

Figure 1:
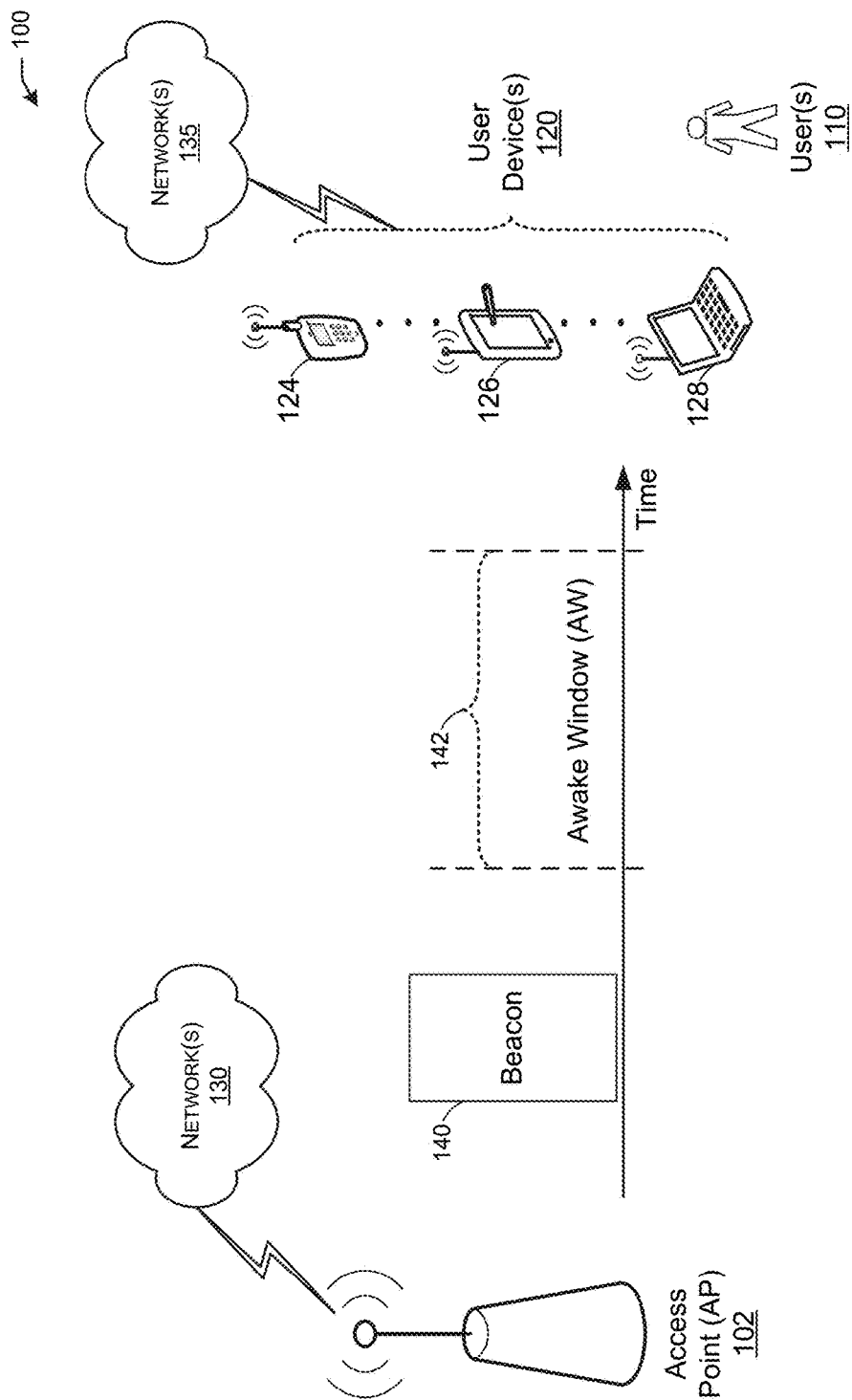
FIG. 1 depicts a network diagram illustrating an example network environment for awake window (AW) protection, in accordance with one or more example embodiments of the present disclosure.

Example embodiments described herein provide certain systems, methods, and devices for AW protection. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a (DMG) network, next generation 60 GHz (NG60) network, an enhanced directional multi-gigabit (EDMG) network, and/or any other network. Devices operating in EDMG may be referred to herein as EDMG devices. This may include user devices and/or access points (APs) or other devices capable of communicating in accordance with a communication standard.

An awake window (AW) plays a central role in the power management of directive multi-gigabit networks such as those based on IEEE 802.11 standards, including IEEE 802.11ad/11ay. The AW may be used to allow devices that are in low power mode to connect with each other and synchronize awake periods. The size of the AW is an important factor in saving power, since shorter AW durations allow saving more power.

Channel access during an AW may be limited to transmissions of very short frames specifically dedicated for power management (PM) purposes—for example, announcement traffic indication messages (ATIMs). The AW may be scheduled by an access point (AP) or a personal basic service set (PBSS) control point (PCP). Thus, all associated and non-associated stations (STAs) are aware of the AW scheduling. However, the AW is not protected from associated or non-associated STAs transmitting any type of frames during the AW. As a result, access during the AW may become congested due to neighboring contention and may even be blocked by a network allocation vector (NAV) setting as a result of neighboring BSS activity where the NAV interval may be longer than the remaining AW duration. NAV is a virtual carrier-sensing mechanism used with wireless network protocols such as IEEE 802.11. The virtual carrier sensing is a logical abstraction, in addition to physical carrier sensing at the air interface. The media access control (MAC) layer frame headers contain a duration field that specifies the transmission time required for the frame, in which time the medium will be busy. STAs listening on the wireless medium read the duration fields and set their NAVs, which are indicators for stations on how long they must defer from accessing the medium.

Example embodiments of the present disclosure relate to systems, methods, and devices for AW protection.

A directional multi-gigabit (DMG) communication may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11 ay project.

Distributed coordination function (DCF) is a media access control (MAC) technique of the IEEE 802.11 based WLAN standard. According to DCF, before transmitting a data frame, an STA must sense the channel to determine whether any other station is transmitting. If the medium is found to be idle for an interval longer than the distributed interframe space (DIFS), the STA continues with its transmission. If the medium is busy, the transmission may be deferred until the end of the ongoing transmission. A random interval, referred to as the backoff time, is then selected, which is used to initialize the backoff timer. The backoff timer is decreased for as long as the channel is sensed as idle, is stopped when a transmission is detected on the channel, and is reactivated when the channel is sensed as idle again for more than a DIFS. The STA is enabled to transmit its frame when its backoff timer reaches zero.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

In one embodiment, an AW protection system may determine one or more AW access rules. The one or more AW access rules may specify, for the four access categories (ACs) of enhanced distributed channel access (EDCA), that no backoff slots for any of the four EDCA access categories occur during an AW. That is, the backoff timers of all four EDCA access categories are suspended during an AW. Since the backoff timers of the four EDCA access categories may be suspended in the AW, non-ATIM frame transmissions may not happen during the AW for associated or non-associated STAs. That is, no STA may transmit non-ATIM frames during the AW. Also, a non-associated STA may not transmit neither ATIM nor non-ATIM frames during the AW. However, an associated STA may transmit ATIM frames in the AW but may not transmit non-ATIM frames during the AW.

In some embodiments, the one or more AW rules for access may include that the ATIM backoff procedure starts and resumes at the start of the AW, no ATIM backoff slots for ATIM frame transmission may be allocated outside of the AW, or the ATIM backoff timer is suspended outside the AW. For example, an AW protection system may determine that the ATIM backoff timer may resume at the start of the AW. In another embodiment, the ATIM backoff timer may be reset to zero at end of the AW, such that the backoff procedure starts new for each AW.

In one embodiment, an AW protection system may introduce new NAV rules for the AW. One rule may be that a new AW trigger frame may be defined that is sent by AP/PCP with a receiver address or receiving station address (RA address) equal to the basic service set identifier (BSSID).

In other embodiments, an AW protection system may be configured to introduce new NAV rules for the AW. For example, the new NAV rules may include, at least in part, that (1) the AW trigger frame may be sent by the AP/PCP using control the PHY mode at the start of the AW; (2) the duration field of the AW trigger frame may cover the entire AW duration; (3) if a user device is associated with a BSS of an AP/PCP, then the user device may be allowed to decrement the ATIM backoff timer during the NAV time established by the AW trigger frame; and (4) no user devices may decrement non-ATIM backoff timers for the duration of the AW. That is, on-ATIM frame transmissions may not happen during the AW. That is, no STA may transmit non-ATIM frames during the AW. Also, a non-associated STA may not transmit neither ATIM nor non-ATIM frames during the AW. However, an associated STA may transmit ATIM frames in the AW but may not transmit non-ATIM frames during the AW. With these rules, the user devices that are outside the BSS and that receive the AW trigger frame may not contend to access the channel during the AW. It should be understood that the above rules are only for illustrative purposes, and other rules may be implemented.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for AW protection, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with the user devices 120, it should be understood that this is only for illustrative purposes and that any user device 120 may also communicate using multiple antennas with other user devices 120 and/or the AP 102.

Figure 5:
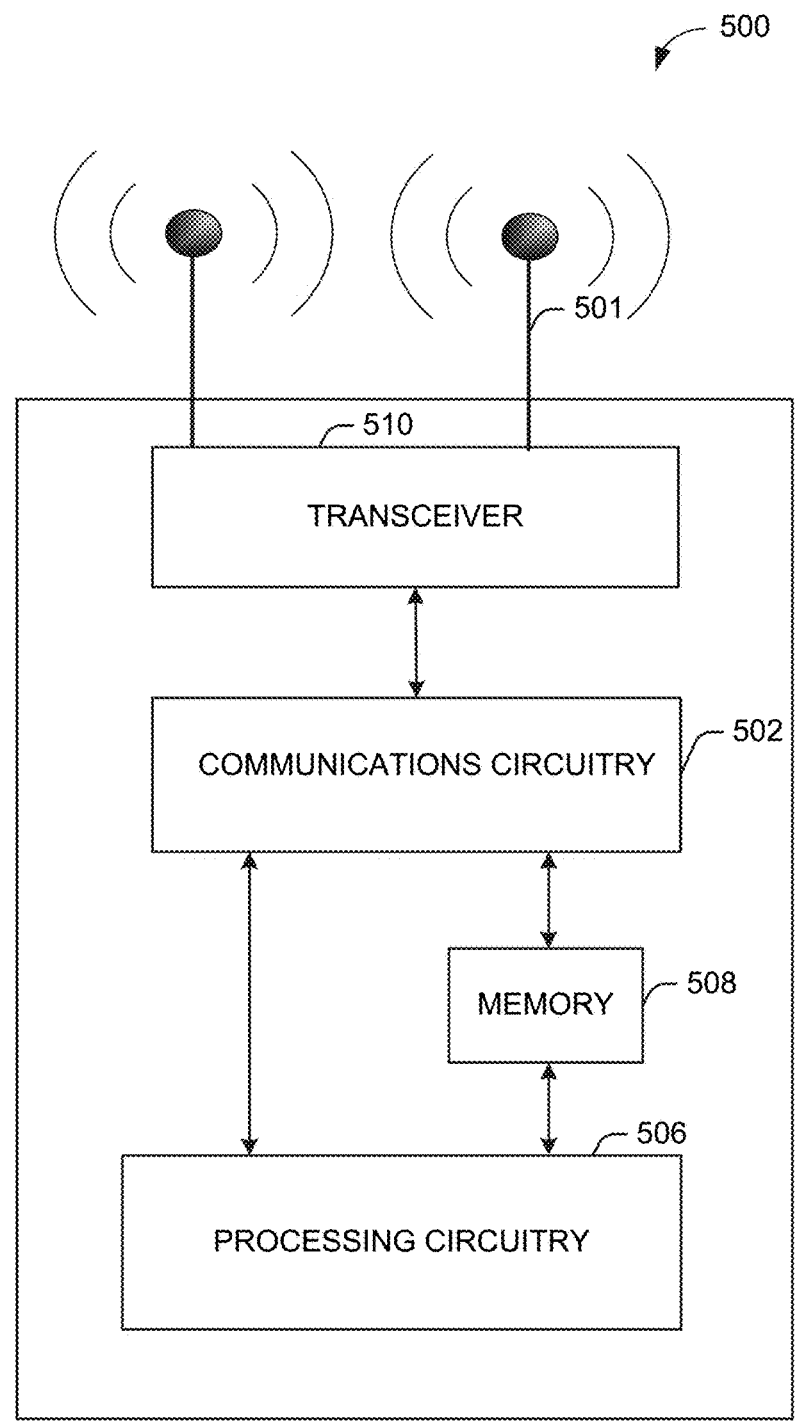
FIG. 5 illustrates a functional diagram of an example communication station that may be suitable for use as a user device, in accordance with one or more example embodiments of the present disclosure.
Figure 6:
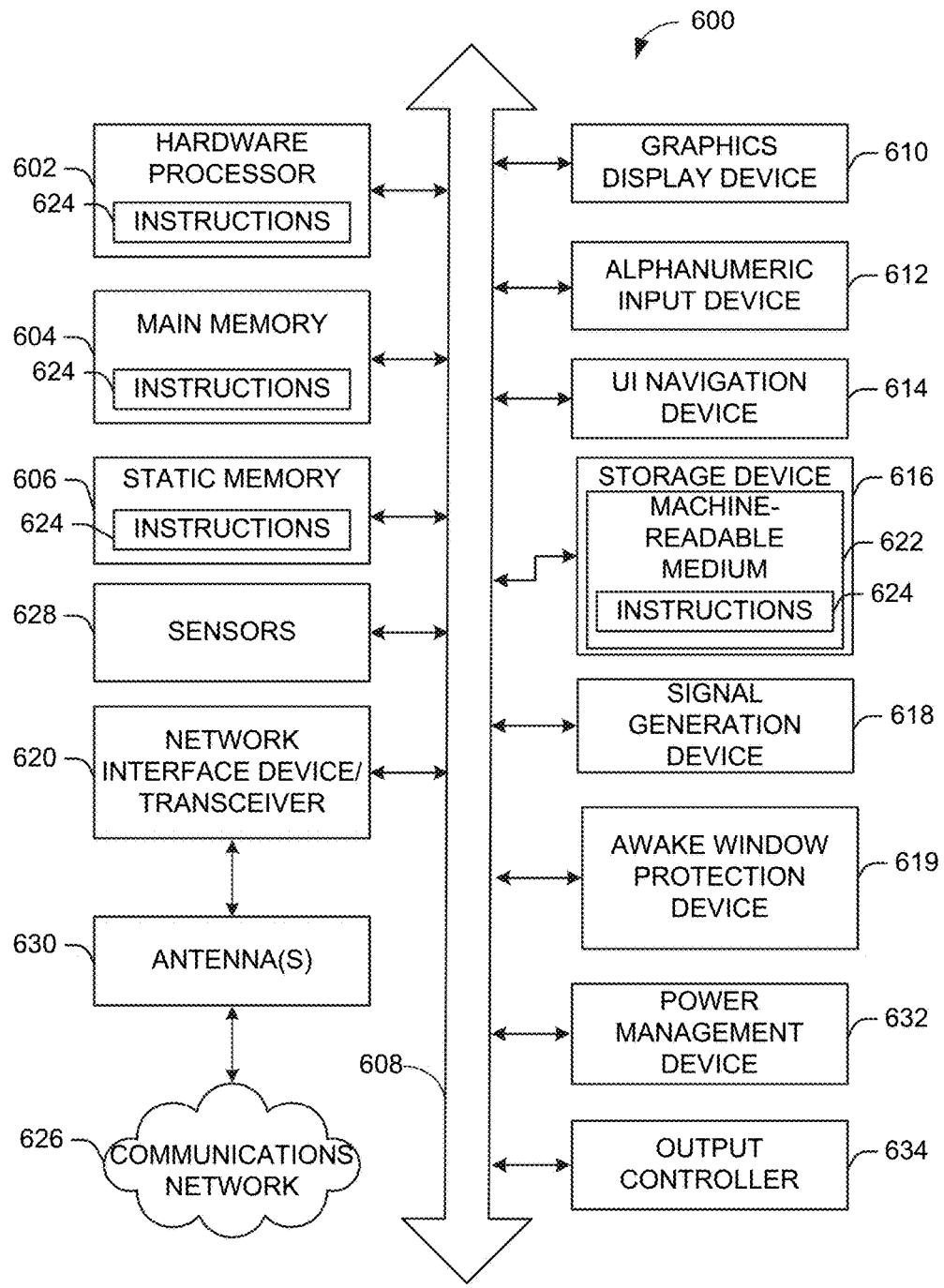
FIG. 6 is a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 5 and/or the example machine/system of FIG. 6.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)," as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

A channel access delay may include various durations; for example, interframe space (IFS) that corresponds to an interval of time between the issuance of two frames. It is understood that the IFS may have various types of intervals according to the various wireless standards. For example, according to the IEEE 802.11 standards, the IFS may have three types: (1) short IFS (SIFS), which is the minimum time between the last symbol of a frame and the beginning of the first symbol of the next frame; (2) distributed coordination function IFS (DIFS), which may be used when a station wants to initiate a communication; and (3) point coordination function IFS (PIFS), which may be used by an AP to perform polling. The channel access delay may be set automatically by the system or may be set by the administrator or by a user on the system. It is understood that the channel access delay may follow communications standards, such as IEEE 802.11 standards and its various provisions.

Distributed coordination function (DCF) is a MAC technique of the IEEE 802.11 standard. DCF requires a station wishing to transmit to listen for the channel status for a DIFS interval. If the channel is found busy during the DIFS interval, the station defers its transmission. In a network where a number of stations contend for the wireless medium, if multiple stations sense the channel is busy and defer their access, they will also virtually simultaneously find that the channel is released and then try to seize the channel. As a result, collisions may occur. In order to avoid such collisions, the DCF also specifies random backoff, which forces a station to defer its access to the channel for an extra period.

It is understood that a basic service set (BSS) provides the basic building block of an 802.11 wireless LAN. For example, in infrastructure mode, a single access point (AP) together with all associated stations (STAs) is called a BSS.

It is understood that a beacon frame is one of the management frames in IEEE 802.11-based WLANs. The beacon frame may contain all of the information about the network. Beacon frames are transmitted periodically to announce the presence of a wireless LAN. Beacon frames are transmitted by the AP in an infrastructure basic service set (IBSS). In an IBSS network, beacon generation is distributed among the stations (STAs). A beacon interval may represent the amount of time between beacon transmissions. The time at which a device (e.g., an AP or PCP) must send a beacon is known as the target beacon transmission time (TBTT). Before a station enters power save mode, the station needs the beacon interval to know when to wake up to receive the beacon (and learn whether there are buffered frames at the access point).

Announcement traffic indication messages (ATIMs) are management frames that may be used in IEEE 802.11 to announce the existence of buffered frames. These messages are sent between wireless stations to prevent them from entering power saving mode and to signal that the STA should move to an active state (or power on), and to indicate there is data to follow.

The NAV is a virtual carrier-sensing mechanism used with wireless network protocols such as IEEE 802.11. The virtual carrier sensing is a logical abstraction, which limits the need for physical carrier sensing at the air interface in order to save power. The MAC layer frame headers contain a duration field that specifies the time to complete exchange of all following frames not including the frame the duration field is set, so the duration field of last frame in the sequence is set to zero. The STAs listening on the wireless medium read the duration field and set their NAVs, which are indicators for STAs on how long they must defer from accessing the medium.

In one embodiment, and with reference to FIG. 1, a beacon frame 140 may be utilized in order to wake up one or more user devices 120. The beacon frame 140 may be sent by an AP 102 or by a PCP. The user devices 120 may be in an awake (powered on) state or an asleep (powered off) state. An awake window (AW) 142 may be utilized in the power management of directive multi-gigabit networks such as those based on IEEE 802.11ad/11ay. The AW 142 may be used to allow devices that are in low power mode to connect with each other and synchronize awake periods. The size of the AW is an important factor in saving power, since shorter AW durations allow saving more power. Channel access during an AW is limited to transmissions of very short frames specifically dedicated for power management purposes, such as ATIM frames. In scenarios where two or more devices belong to same or different BSSs, where these BSSs reside in the same frequency channel, the devices transmitting during an allocated AW may interfere with the devices wanting to transmit management frames during the allocated AW.

In one embodiment, one or more rules may be implemented on STAs that receive the beacon frame 140. For example, if the AP 102 (or a PCP) sends the beacon frame 140 to the user devices 120 (STAs), the beacon frame 140 may contain an information element (IE) associated with the AW. This IE may specify the characteristics of the AW. For example, the IE may indicate information such as the length of the AW or other information related to the AW. When the beacon frame 140 is received by, for example, the user device 124, the user device 124 may implement one or more rules associated with transmitting management and/or data frames to the AP 102. Some of these rules may restrict the user device 124 in transmitting data frames to the AP 102, based at least in part on whether the user device 124 is part of the BSS associated with the AP 102. For example, if the AP is associated with BSS1, and the user device 124 is also associated with BSS1, a set of rules may apply to the user device 124 when transmitting management and/or data frames to the AP 102. If, however, the user device 124 is associated with a different BSS than that of the AP 102, then the user device 124 may implement a different set of rules when transmitting management and/or data frames.

However, regardless of which BSS the user device 124 is associated with, one of the rules may specify for the four ACs of EDCA, that no backoff slots for any of the four EDCA access categories occur during the AW 142. That is, the backoff timers of all four EDCA access categories are suspended during the AW 142. These backoff timers may be associated with frames that are not management frames, for example, data frames. Since the backoff timers of the four EDCA access categories may be suspended in the AW, non-ATIM frame transmissions may not happen during the AW. That is, no STA may transmit non-ATIM frames during the AW. Also, a non-associated STA may not transmit neither ATIM nor non-ATIM frames during the AW. However, an associated STA may transmit ATIM frames in the AW but may not transmit non-ATIM frames during the AW.

The user device 124 may implement a new access category for AW access. For example, the rules for this AW access may include that the ATIM backoff procedure starts and resumes at the start of the AW, no ATIM backoff slots for ATIM frame transmission may be allocated outside of the AW, and the ATIM backoff timer is suspended outside the AW. In other words, the ATIM frames should be transmitted during the AW and not outside the AW. In the case where the ATIM backoff procedure starts at the start of the AW, the ATIM backoff may be reset to zero in case there was a residual time left on the backoff timer during the first AW. For example, the user device 124 may have associated a random ATIM backoff timer with an ATIM frame that the user device 124 intends to transmit during the AW. The ATIM backoff timer may be decremented before the user device 124 is able to transmit the ATIM frame. However, the AW may have expired or ended before the user device 124 was able to decrement the ATIM backoff timer to zero. For example, a residual time left on the ATIM backoff timer may be two time units. In that case, in the next AW opportunity, the user device 124 may initiate its ATIM backoff timer using the residual time left at the expiration of the first AW (e.g., two time units), or reset its ATIM backoff timer to zero at the start of the second AW.

The user device 124 may implement other rules, including, at least in part, that (1) the AW trigger frame is sent by the AP/PCP using the control PHY mode at the start of the AW; (2) the duration field of the trigger frame covers the entire AW duration; (3) if the user device 124 is associated with the BSS1 of the AP/PCP 102, then the user device 124 is allowed to decrement the ATIM backoff timer during the NAV time established by the AW trigger frame; and (4) no user devices may decrement non-ATIM backoff timers for the duration of the AW. That is, on-ATIM frame transmissions may not happen during the AW. That is, no STA may transmit non-ATIM frames during the AW. Also, a non-associated STA may not transmit neither ATIM nor non-ATIM frames during the AW. However, an associated STA may transmit ATIM frames in the AW but may not transmit non-ATIM frames during the AW. With these rules, user devices that are outside the BSS and that receive the trigger frame may not contend to access the channel during the AW. It should be understood that the above rules are only for illustrative purposes, and other rules may be implemented.

Figure 2:
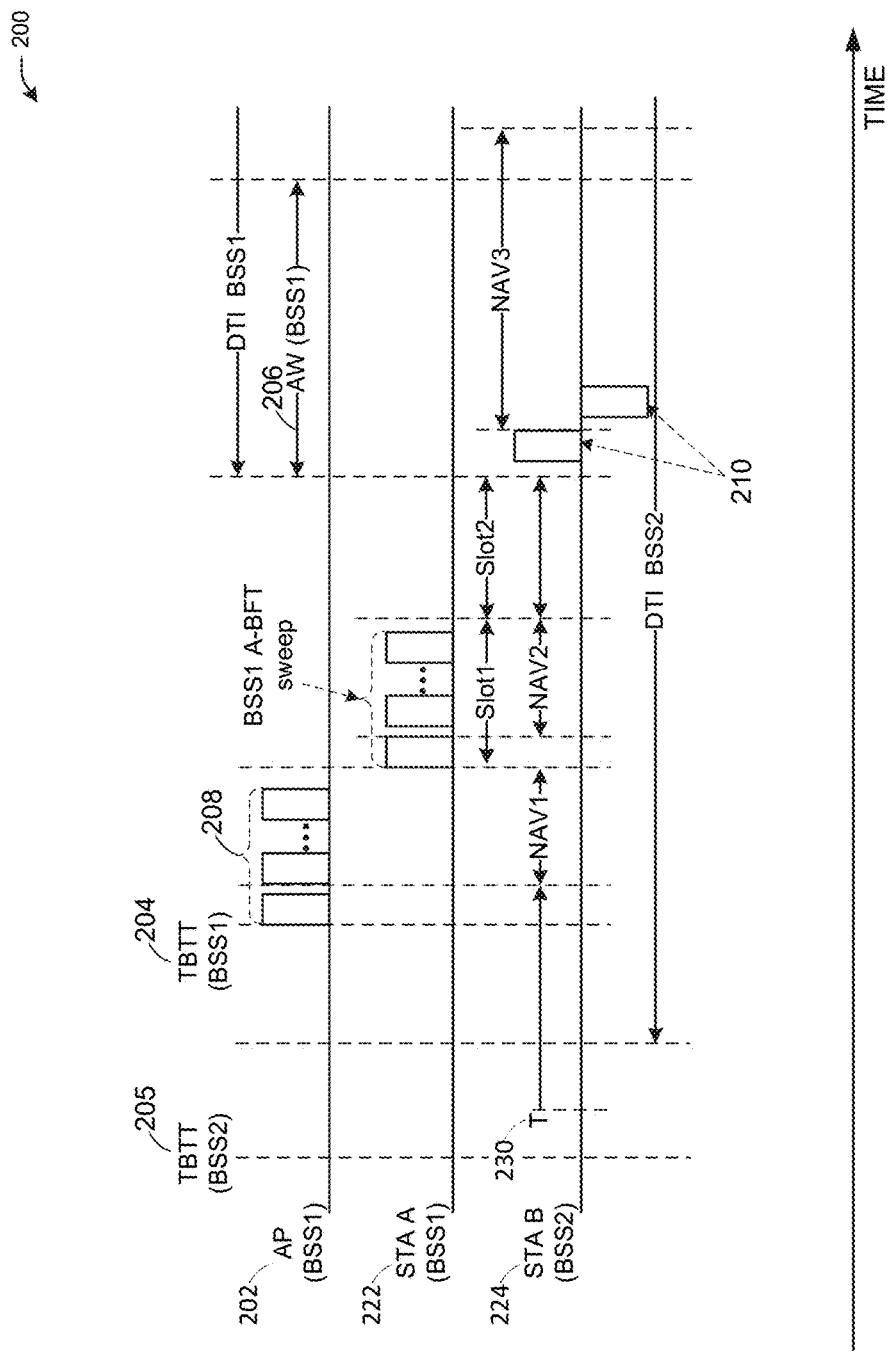
FIG. 2 depicts an illustrative schematic diagram of an AW in overlapping basic service sets (BSSs).

FIG. 2 depicts an illustrative schematic diagram 200 of an AW in overlapping BSSs.

Referring to FIG. 2, there is shown an AP (e.g., AP 202) and two stations (e.g., STA A 222 and STA B 224). The STA A 222 and the STA B 224 may be the user devices 120 of FIG. 1. The AP 202 may be any of the APs 102 (or PCPs) of FIG. 1. The AP 202, the STA A 222, and the STA B 224 may perform transmissions in accordance with a channel access mechanism. In various embodiments, the channel access mechanism may generally define a medium access control (MAC)-layer scheme for prioritizing between MAC service data units (MSDUs) in conjunction with engaging in wireless transmission in a wireless network. The channel access mechanism may define a scheme according to which a given MSDU may be mapped to one of multiple defined ACs, for example, AC for best effort (AC_BE), AC for background (AC_BK), AC for video (AC_VI), or AC for voice (AC_VO).

Beacon frames may be used by the APs (and PCPs) to communicate throughout the service area the characteristics of the connection offered to the STAs. Information contained in the beacon frames may be used by the STAs trying to connect to the network as well as the STAs already associated with the BSS. Beacon frames are sent periodically at a time called target beacon transmission time (TBTT).

In the example of FIG. 2, STA A 222 is associated with AP 202 and may be assigned a BSS1, and STA B 224 may belong to BSS2. Although BSS1 and BSS2 are different, they may reside in the same frequency channel. The BSS1 and the BSS2 may each have a TBTT associated with them. For example, the BSS1 may have a TBTT 204 associated with it, and the BSS2 may have a TBTT 205 associated with it. In this example, TBTT 204 may be placed in middle of the BSS2 beacon interval (BI) indicating that beacon frames associated with BSS1 will be sent. In the example of FIG. 2, at the TBTT 204, the AP 202 may transmit a BSS1 beacon sweep 208 of a DMG beacon frame that may schedule association beamforming training (A-BFT) of two slots and the AW 206 of some declared duration. The STA A 222 may utilize a first slot (e.g., Slot 1) of the A-BFT and the second slot (e.g., Slot 2) may be left unpopulated. A pending media access control protocol data unit (MPDU) may be waiting for transmission for the STA B 224 since time T 230. A backoff timer (BOFF) associated with the MPDU may be decremented when the DMG beacon frame of the BSS1 beacon sweep 208 is received by STA B 224. At that time, the backoff timer may be suspended for the duration of NAV1, which is set up from the duration field of the received beacon (e.g., from the BSS1 beacon sweep 208). It should be appreciated that the NAV is used to indicate, in microseconds, how long the channel is reserved by another station and counts down to zero. In case no backoff slots for the DCF occur during the A-BFT, the backoff timer may be suspended during the A-BFT as per the A-BFT setup delivered in the beacon. The backoff timer may be suspended even for unpopulated A-BFT slots.

In this mechanism, a request-to-send/directional multi-gigabit clear-to-send (RTS/DMG CTS) frames 210 may be sent. When an STA receives an RTS/DMG CTS frame, it sets its NAV value to the value in the duration field in the MAC header of the RTS/DMG CTS.

When the backoff timer for a particular AC reaches zero, that AC obtains exclusive channel access for a period of time called the transmit opportunity (TXOP). During the TXOP, only frames with user priority of the data being transferred mapped to that AC may be transmitted. If the backoff timers of two or more ACs reach zero at the same time, channel access is granted to the AC with the highest priority, and the other ACs treat this occurrence as if it were an external collision that happened in the wireless medium.

The backoff timer may expire inside the AW 206 and because an access in the AW 206 is defined as regular EDCA, the STA B 224 (BSS2) may initiate a transmit of the pending MPDU. However, if the AP 202 (BSS1) wants to transmit an ATIM frame to STA A 222 (BSS1), it will need to wait for NAV3 to expire, which may in some cases last for the entire duration of the AW. Therefore, the AP 202 and the STA A 222 may not have been able to use the AW 206 in order to transmit the ATIM frames, which was the purpose of setting up the AW in the first place. The AP 202 and the STA A 222 would have to wait for another AW to be able to send and receive ATIM frames.

Figure 3:
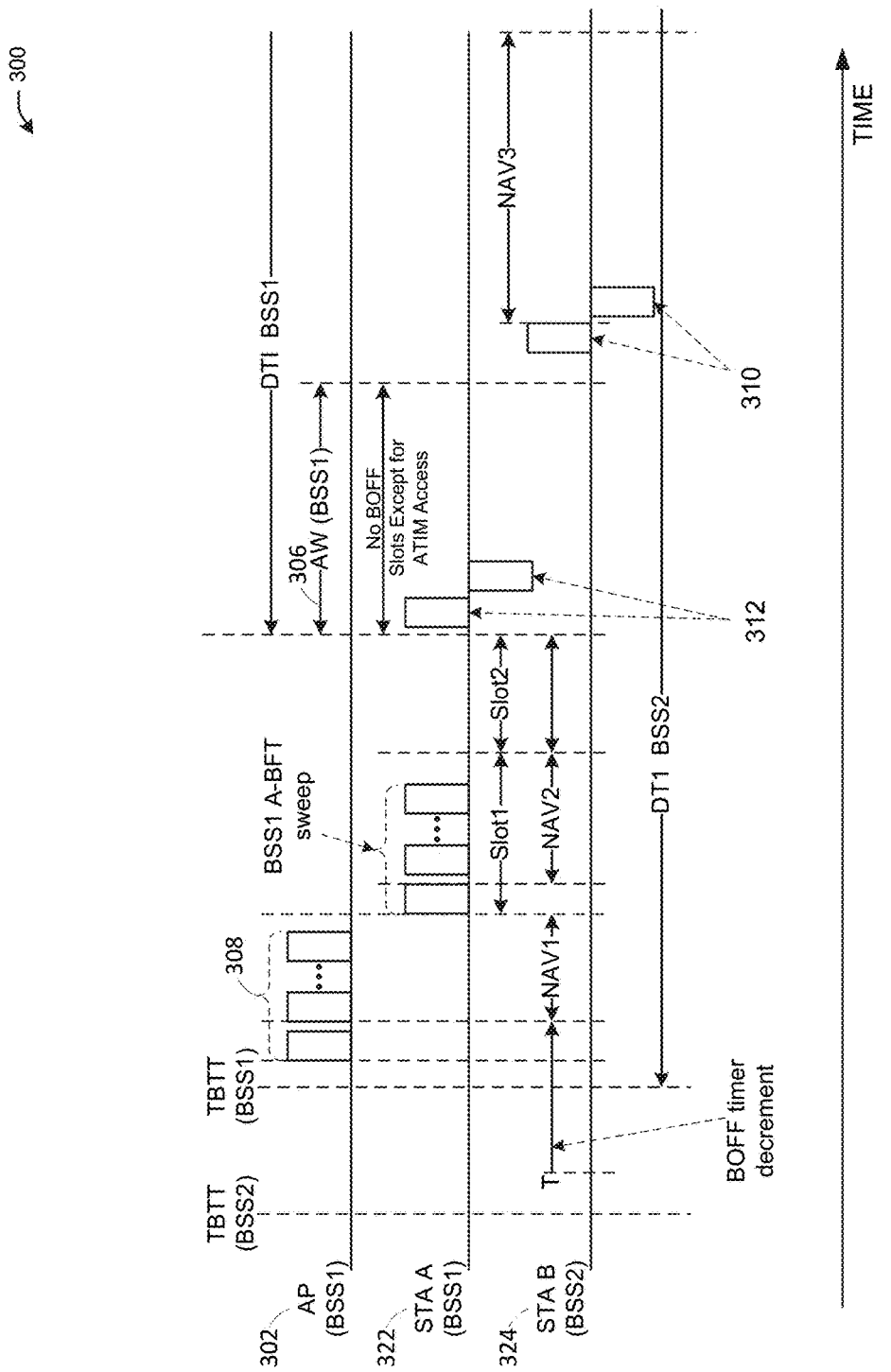
FIG. 3 depicts an illustrative schematic diagram of an announcement traffic indication message (ATIM) transmission in overlapping BSSs, in accordance with one or more example embodiments of the present disclosure.

FIG. 3 depicts an illustrative schematic diagram 300 of an ATIM frame transmission in overlapping BSSs, in accordance with some demonstrative embodiments.

Referring to FIG. 3, there is shown an AP (e.g., AP 302) and two stations (e.g., STA A 322 and STA B 324). In this scenario, STA A 322 is associated with the AP 302 and may be assigned a BSS1, and STA B 324 may belong to BSS2. The BSS1 and the BSS2 may reside in the same frequency channel. A TBTT of the BSS1 may be placed in middle of the BSS2 beacon interval (BI). At the TBTT (BSS1), the AP (BSS1) may transmit a sweep of a BSS1 beacon sweep 308 of a DMG beacon frame that schedules association beam-forming training (A-BFT) of two slots and the AW of some declared duration. The STA A 322 may utilize a first slot of the A-BFT, and the second slot may be left unpopulated.

In one embodiment, the AW access rules may be determined to specify, for the four ACs of EDCA, that no backoff slots for any of the four EDCA access categories occur during an AW 306. That is, the backoff timers of all four EDCA access categories are suspended.

In one embodiment, a new access category may be determined for AW access. In this access, PIFS and CWmin=((aCWmin+1)/8−1) may be used for backoff, where aCWmin specifies the value of the minimum size of the contention window (CW) used for channel access. These parameters may decrease the time for first access, which enables an AW duration of about 100 μs. For example, AC for video (AC_VI) parameters may be used for an AW duration of hundreds of μs.

In some embodiments, the rules for this access may include that the backoff procedure starts and resumes at the start of the AW, no backoff slots for ATIM frame transmission may be allocated outside of the AW 306, and the backoff timer for the ATIM frame transmission is suspended outside the AW 306.

In one embodiment, the backoff timer may resume at the start of the AW 306. In another embodiment, the backoff timer may be reset to zero at end of the AW 306, such that the backoff procedure starts after each AW 306.

In one embodiment, since the backoff timers of the four EDCA access categories may be suspended in the AW, non-ATIM frame transmissions may not happen during the AW. Hence, the RTS/DMG CTS frames 310 may be deferred to a later time. As a result, the ATIM frame 312 may be sent in a short time after the AW starts. That is, no STA may transmit non-ATIM frames during the AW. Also, a non-associated STA may not transmit neither ATIM nor non-ATIM frames during the AW. However, an associated STA may transmit ATIM frames in the AW but may not transmit non-ATIM frames during the AW.

In one embodiment, an additional option may be to introduce new NAV rules for the AW 306. For example, the new NAV rules may include at least in part, that (1) the AW trigger frame may be sent by the AP 302 (or PCP) using the control PHY mode at the start of the AW; (2) the duration field of the AW trigger frame may cover the entire AW duration; (3) if the STA A 322 is associated with BSS1 of the AP 302, then the STA A 322 may be allowed to decrement the ATIM backoff timer during the NAV time established by the AW trigger frame; and (4) no user devices (associated or non-associated) may decrement non-ATIM backoff timers for the duration of the AW 306. That is, on-ATIM frame transmissions may not happen during the AW 306. With these rules, the user devices that are outside the BSS and that receive the trigger frame may not contend to access the channel during the AW 306. It should be understood that the above rules are only for illustrative purposes, and other rules may be implemented.

Figure 4:
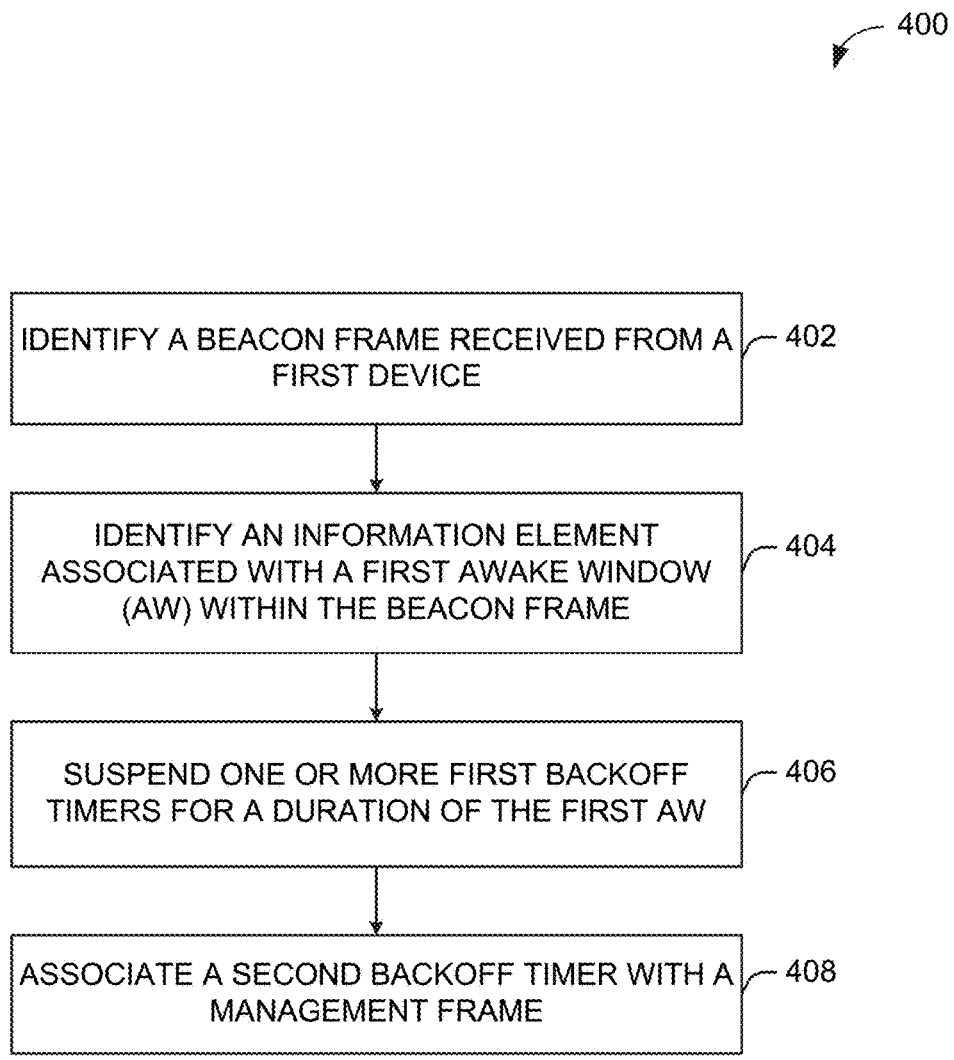
FIG. 4 depicts a flow diagram of an illustrative process for AW protection, in accordance with one or more example embodiments of the present disclosure.

FIG. 4 illustrates a flow diagram of an illustrative process 400 for AW protection, in accordance with one or more example embodiments of the present disclosure.

At block 402, a device (e.g., the user device(s) 120 and/or the AP 102 (or PCP) of FIG. 1) may identify a beacon frame received from a first transmitting device (e.g., the user device(s) 120 and/or the AP 102 (or PCP) of FIG. 1). For example, the AP 102 of FIG. 1 may perform a sweep of a beacon frame to send the beacon frame in multiple directions. The beacon frame may be a directional multi-gigabit (DMG) beacon frame. The beacon frame may be received by one or more user devices 120.

At block 404, the device may identify an information element associated with a first awake window (AW) within the beacon frame. For example, a user device 120 may receive the beacon frame from a transmitting device (e.g., the AP 102) and may decode or otherwise extract information from the beacon frame. Some of the information may include, but is not limited to, an information element (IE) associated with an AW. An awake window (AW) plays a central role in the power management of directive multi-gigabit networks such as those based on IEEE 802.11 standards, including IEEE 802.11ad/11ay. The AW may be used to allow devices that are in low power mode to connect with each other and synchronize awake periods. The size of the AW is an important factor in saving power, since shorter AW durations allow saving more power.

At block 406, the device may suspend one or more first backoff timers for a duration of the first AW. For example, the user device 120 of FIG. 1 may establish one or more first backoff timers associated with non-ATIM frames (e.g., data frames). Each of the one or more first backoff timers may be associated with a quality of service (QOS). For example, when the backoff timer for a particular AC reaches zero, that AC obtains exclusive channel access for a period of time TXOP. During the TXOP, only frames with user priority of the data being transferred mapped to that AC may be transmitted. If the backoff timers of two or more ACs reach zero at the same time, channel access is granted to the AC with the highest priority, and the other ACs treat this occurrence as if it were an external collision that happened in the wireless medium. For the four ACs of EDCA, no backoff slots for any of the four EDCA ACs occur during an AW. That is, the one or more backoff timers of all four EDCA ACs are suspended during an AW. Subsequently, the user device 120 may release the one or more first backoff timers at an end of the first AW. That is, the user device 120 may permit the one or more backoff timers to continue or resume decrementing until reaching zero in order to obtain channel access to transmit frames.

At block 408, the device may associate a second backoff timer with a management frame. For example, the user device 120 may determine a management frame, such as an ATIM frame or any other management or control frame that may need to be transmitted during an AW. The ATIM frame may be associated with an ATIM backoff timer, such that the ATIM frame may be transmitted after the ATIM backoff timer reaches zero, in addition to a channel access time (e.g., PIFS). The user device 120 may determine whether it is associated with the same BSS as the AP 102 of FIG. 1. In that case, the user device 120 may decrement the ATIM backup timer within the first AW. Subsequently, the user device 120 may send the ATIM frame based at least in part on the ATIM backoff timer expiring. Alternatively, if the user device 120 determines that it is not associated with the same BSS and has the AP 102, the user device 120 may then suspend the ATIM backoff timer for the duration of the first AW. In other words, a user device that is not associated with the same BSS as the transmitting device (e.g., the AP 102 of FIG. 1) may not transmit ATIM frames or non-ATIM frames for the duration of the AW. In the case where at the expiration of the AW the ATIM backoff timer reaches zero, such that the residual time unit still exists in the ATIM backoff timer, the user device 120 may wait to receive another beacon frame with information regarding the second AW. When the user device 120 determines the AW from the received beacon frame, the user device may reset the ATIM backoff timer to zero after the first AW expires in order to be synchronized with other ATIM backoff timers associated with other user devices. In another example, the user device 120 may determine a residual time associated with the ATIM backoff timer at an expiration of the first AW. The user device 120 may then set the ATIM backoff timer to the residual time at the beginning of a second AW. It is understood that the above descriptions are for purposes of illustration, and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an AW protection device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The AW protection device 619 may carry out or perform any of the operations and processes (e.g., the process 400) described and shown above. For example, the AW protection device 619 may be configured to facilitate one or more devices to communicate over a next generation 60 GHz (NG60) network, an enhanced DMG (EDMG) network, and/or any other network. For example, the one or more devices may be configured to communicate over the NG60 or EDMG networks.

The AW protection device 619 may be configured to determine AW access rules to specify, for the four ACs of enhanced distributed channel access (EDCA), that no backoff slots for any of the four EDCA access categories occur during an AW. That is, the backoff timers of all four EDCA access categories are suspended.

The AW protection device 619 may be configured to determine a new access category for AW access. In some embodiments, the rules for this access may include that the backoff procedure starts and resumes at the start of the AW, no backoff slots for ATIM frame transmission may be allocated outside of the AW, and the backoff timer for ATIM frame transmission is suspended outside the AW.

The AW protection device 619 may be configured to determine that the backoff timer may resume at the start of the AW. The backoff timer may be reset to zero at end of the AW, such that the backoff procedure starts for each AW. In one embodiment, since the backoff timers of the four EDCA access categories may be suspended in the AW, non-ATIM frame transmissions may not happen during the AW. It is understood that the above descriptions are for purposes of illustration and are not meant to be limiting.

The AW protection device 619 may be configured to introduce new NAV rules for the AW. For example, the new NAV rules may include, at least in part, that (1) an AW trigger frame may be sent by the AP/PCP using the control PHY mode at the start of the AW; (2) the duration field of the AW trigger frame may cover the entire AW duration; (3) if a user device is associated with a BSS of an AP/PCP, then the user device may be allowed to decrement the ATIM backoff timer during the NAV time established by the AW trigger frame; and (4) no user devices may decrement non-ATIM backoff timers for the duration of the AW. That is, on-ATIM frame transmissions may not happen during the AW. With these rules, the user devices that are outside the BSS and that receive the AW trigger frame may not contend to access the channel during the AW. It should be understood that the above rules are only for illustrative purposes, and other rules may be implemented.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions. The device may further include instructions to identify a beacon frame received from a first device. The device may further include instructions to identify an information element associated with a first awake window (AW) within the beacon frame. The device may further include instructions to suspend one or more first backoff timers for a duration of the first AW. The device may further include instructions to associate a second backoff timer with a management frame.

The implementations may include one or more of the following features. The beacon frame is a directional multi-gigabit beacon frame. The device may further include instructions to determine the device is associated with a basic service set (BSS) of the first device. The device may further include instructions to decrement the second backup timer within the first AW. The device may further include instructions to cause to send the management frame based at least in part on the second backoff timer. The device may further include instructions to determine the device is not associated with the BSS of the first device. The device may further include instructions to suspend the second backoff timer for a duration of the first AW. The device may further include instructions to reset the second backoff timer to zero when the first AW expires.

The management frame is an announcement traffic identification message (ATIM). Each of the one or more first backoff timers is associated with a quality of service (QOS). The device may further include instructions to release the one or more first backoff timers at an end of the first AW. The device may further include instructions to determine a residual time associated with the second backoff timer at an expiration of the first AW. The device may further include instructions to set the second backoff timer to the residual time at a beginning of a second AW. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying a beacon frame received from a device. The operations may include identifying an information element associated with a first awake window (AW) within the beacon frame. The operations may include suspending one or more first backoff timers for a duration of the first AW. The operations may include associating a second backoff timer with a management frame.

The implementations may include one or more of the following features. The beacon frame is a directional multi-gigabit beacon frame. The operations further comprise determining a first basic service set (BSS). The operations may include determining a second BSS associated with the device. The operations may include determining the first BSS is the same as the second BSS. The operations may include decrementing the second backoff timer within the first AW. The operations may include causing to send the management frame based at least in part on the second backoff timer. The operations further comprise releasing the one or more first backoff timers at an expiration of the first AW. The operations may further comprise determining a first basic service set (BSS). The operations may include determining a second BSS associated with the device. The operations may include determining the first BSS is different from the second BSS. The operations may include suspending the second backoff timer for the duration of the first AW. The operations may further comprise resetting the second backoff timer to zero when the first AW expires. The management frame is an announcement traffic identification message (ATIM). Each of the one or more first backoff timers is associated with a quality of service (QOS). The operations may further comprise determining a residual time associated with the second backoff timer at an expiration of the first AW. The operations may include setting the second backoff timer to the residual time at a beginning of a second AW.

According to example embodiments of the disclosure, there may include a method. The method may include identifying, by one or more processors, a beacon frame received from a device. The method may include identifying an information element associated with a first awake window (AW) within the beacon frame. The method may include suspending one or more first backoff timers for a duration of the first AW. The method may include associating a second backoff timer with a management frame.

The implementations may include one or more of the following features. The beacon frame is a directional multi-gigabit beacon frame. The method may further include releasing the one or more first backoff timers at an expiration of the first AW. The method may further include determining the device is associated with a basic service set (BSS) of the first device. The method may include decrementing the second backup timer within the first AW. The method may include causing to send the management frame based at least in part on the second backoff timer. The method may further include determining the device is not associated with the BSS of the first device. The method may include suspending the second backoff timer for a duration of the first AW. The method may further include resetting the second backoff timer to zero when the first AW expires. The management frame is an announcement traffic identification message (ATIM). The method may further include releasing the one or more first backoff timers at an end of the first AW. The method may further include determining a residual time associated with the second backoff timer at an expiration of the first AW. The method may include setting the second backoff timer to the residual time at a beginning of a second AW.

In example embodiments of the disclosure, there may be an apparatus. The apparatus may include means for identifying, by one or more processors, a beacon frame received from a device. The apparatus may include means for identifying an information element associated with a first awake window (AW) within the beacon frame. The apparatus may include means for suspending one or more first backoff timers for a duration of the first AW. The apparatus may include means for associating a second backoff timer with a management frame.

The implementations may include one or more of the following features. The beacon frame is a directional multi-gigabit beacon frame. The apparatus may further comprise means for releasing the one or more first backoff timers at an expiration of the first AW. The apparatus may further include means for determining the device is associated with a basic service set (BSS) of the first device. The apparatus may further include means for decrementing the second backup timer within the first AW. The apparatus may further include means for causing to send the management frame based at least in part on the second backoff timer. The apparatus may further include means for determining the device is not associated with the BSS of the first device. The apparatus may further include means for suspending the second backoff timer for a duration of the first AW. The apparatus may further include means for resetting the second backoff timer to zero when the first AW expires. The management frame is an announcement traffic identification message (ATIM). The apparatus may further include means for releasing the one or more first backoff timers at an end of the first AW. The apparatus may further include means for determining a residual time associated with the second backoff timer at an expiration of the first AW. The apparatus may further include means for setting the second backoff timer to the residual time at a beginning of a second AW.

According to example embodiments of the disclosure, there may be a device. The wireless device may include at least one memory that stores computer-executable instructions. The wireless device may further include instructions to identify a beacon frame received from a first device. The wireless device may further include instructions to identify an information element associated with a first awake window (AW) within the beacon frame. The wireless device may further include instructions to suspend one or more first backoff timers for a duration of the first AW. The wireless device may further include instructions to associate a second backoff timer with a management frame.

The implementations may include one or more of the following features. The beacon frame is a directional multi-gigabit beacon frame. The wireless device may further include instructions to determine the device is associated with a basic service set (BSS) of the first device. The wireless device may further include instructions to decrement the second backup timer within the first AW. The wireless device may further include instructions to cause to send the management frame based at least in part on the second backoff timer. The wireless device may further include instructions to determine the device is not associated with the BSS of the first device. The wireless device may further include instructions to suspend the second backoff timer for a duration of the first AW. The wireless device may further include instructions to reset the second backoff timer to zero when the first AW expires. The management frame is an announcement traffic identification message (ATIM). Each of the one or more first backoff timers is associated with a quality of service (QOS). The wireless device may further include instructions to release the one or more first backoff timers at an end of the first AW. The wireless device may further include instructions to determine a residual time associated with the second backoff timer at an expiration of the first AW. The wireless device may further include instructions to set the second backoff timer to the residual time at a beginning of a second AW. The wireless device may further include a transceiver configured to transmit and receive wireless signals. The wireless device may further include one or more antennas coupled to the transceiver.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor configured to access the at least one memory, wherein the at least one processor is configured to execute the computer-executable instructions to:
   identify a beacon frame received from a first device;
   identify an information element associated with a first awake window (AW) within the beacon frame;
   suspend one or more first backoff timers for a duration of the first AW; and
   associate a second backoff timer with a management frame.

2. The device of claim 1, wherein the beacon frame is a directional multi-gigabit beacon frame.

3. The device of claim 1, wherein the at least one processor is further configured to execute the computer-executable instructions to:
   determine the device is associated with a basic service set (BSS) of the first device;
   decrement the second backup timer within the first AW; and
   cause to send the management frame based at least in part on the second backoff timer.

4. The device of claim 1, wherein the at least one processor is further configured to execute the computer-executable instructions to:
   determine the device is not associated with the BSS of the first device; and
   suspend the second backoff timer for a duration of the first AW.

5. The device of claim 1, wherein the at least one processor is further configured to execute the computer-executable instructions to reset the second backoff timer to zero when the first AW expires.

6. The device of claim 1, wherein the management frame is an announcement traffic identification message (ATIM).

7. The device of claim 1, wherein each of the one or more first backoff timers is associated with a quality of service (QOS).

8. The device of claim 1, wherein the at least one processor is further configured to execute the computer-executable instructions to release the one or more first backoff timers at an end of the first AW.

9. The device of claim 1, wherein the at least one processor is further configured to execute the computer-executable instructions to:
   determine a residual time associated with the second backoff timer at an expiration of the first AW; and
   set the second backoff timer to the residual time at a beginning of a second AW.

10. The device of claim 1, further comprising a transceiver configured to transmit and receive wireless signals.

11. The device of claim 10, further comprising one or more antennas coupled to the transceiver.

12. A non-transitory computer-readable medium storing computer-executable instructions which when executed by one or more processors result in performing operations comprising:
    identifying a beacon frame received from a device;
    identifying an information element associated with a first awake window (AW) within the beacon frame;
    suspending one or more first backoff timers for a duration of the first AW; and
    associating a second backoff timer with a management frame.

13. The non-transitory computer-readable medium of claim 12, wherein the beacon frame is a directional multi-gigabit beacon frame.

14. The non-transitory computer-readable medium of claim 12, wherein the operations further comprise:
    determining a first basic service set (BSS);
    determining a second BSS associated with the device;
    determining the first BSS is the same as the second BSS;
    decrementing the second backoff timer within the first AW; and
    causing to send the management frame based at least in part on the second backoff timer.

15. The non-transitory computer-readable medium of claim 12, wherein the operations further comprise releasing the one or more first backoff timers at an expiration of the first AW.

16. The non-transitory computer-readable medium of claim 12, wherein the operations further comprise:
    determining a first basic service set (BSS);
    determining a second BSS associated with the device;
    determining the first BSS is different from the second BSS; and
    suspending the second backoff timer for the duration of the first AW.

17. The non-transitory computer-readable medium of claim 12, wherein the operations further comprise resetting the second backoff timer to zero when the first AW expires.

18. A method comprising:
    identifying, by one or more processors, a beacon frame received from a device;
    identifying an information element associated with a first awake window (AW) within the beacon frame;
    suspending one or more first backoff timers for a duration of the first AW; and
    associating a second backoff timer with a management frame.

19. The method of claim 18, wherein the beacon frame is a directional multi-gigabit beacon frame.

20. The method of claim 18, further comprising releasing the one or more first backoff timers at an expiration of the first AW.

* * * * *